US010694073B2

(12) United States Patent
Sato

(10) Patent No.: US 10,694,073 B2
(45) Date of Patent: Jun. 23, 2020

(54) MULTI-FUNCTION PERIPHERAL, SYSTEM INCLUDING THE MULTI-FUNCTION PERIPHERAL, INFORMATION PROCESSING APPARATUS, METHOD OF CONTROLLING THE SAME, AND STORAGE MEDIUM

(71) Applicant: CANON KABUSHIKI KAISHA, Tokyo (JP)

(72) Inventor: Kei Sato, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 29 days.

(21) Appl. No.: 16/100,887

(22) Filed: Aug. 10, 2018

(65) Prior Publication Data

US 2019/0037105 A1 Jan. 31, 2019

Related U.S. Application Data

(63) Continuation of application No. 15/107,034, filed as application No. PCT/JP2015/055728 on Feb. 20, 2015, now abandoned.

(30) Foreign Application Priority Data

Feb. 24, 2014 (JP) ................................. 2014-033309

(51) Int. Cl.
*H04L 29/06* (2006.01)
*H04N 1/44* (2006.01)
(Continued)

(52) U.S. Cl.
CPC ............ *H04N 1/4413* (2013.01); *B41J 29/00* (2013.01); *B41J 29/38* (2013.01); *G06F 3/12* (2013.01);
(Continued)

(58) Field of Classification Search
CPC ............ H04N 1/4413; H04N 1/00344; H04N 1/00464; H04N 2201/0039;
(Continued)

(56) References Cited

U.S. PATENT DOCUMENTS 4,570,217 A * 2/1986 Allen .................... G06F 9/4881
700/83
2002/0059367 A1 5/2002 Romero
(Continued)

FOREIGN PATENT DOCUMENTS

JP 2002-132646 5/2002
JP 2002236662 8/2002
(Continued)

OTHER PUBLICATIONS

International Search Report and Written Opinion of the International Searching Authority dated May 12, 2015 in International Application PCT/JP2015/055728. (Cited During Prosecution of Parent U.S. Appl. No. 15/107,034.).
(Continued)

*Primary Examiner* — Mahfuzur Rahman
(74) *Attorney, Agent, or Firm* — Venable LLP

(57) ABSTRACT

When a user authentication result is received via a network in response to an instruction for user authentication issued by a user who has operated any of a plurality of user interfaces, a user interface, of the plurality of user interfaces, which has been operated by the user is determined. If the received user authentication result indicates a success, an operation by the user via the determined user interface is permitted.

8 Claims, 9 Drawing Sheets

(51) Int. Cl.
  *B41J 29/00*   (2006.01)
  *B41J 29/38*   (2006.01)
  *G06F 3/12*    (2006.01)
  *G06F 21/31*   (2013.01)
  *G06F 21/62*   (2013.01)
  *H04N 1/00*    (2006.01)

(52) U.S. Cl.
  CPC .......... *G06F 3/1222* (2013.01); *G06F 3/1238* (2013.01); *G06F 3/1285* (2013.01); *G06F 21/31* (2013.01); *G06F 21/629* (2013.01); *H04N 1/00344* (2013.01); *H04N 1/00464* (2013.01); *H04N 2201/0039* (2013.01); *H04N 2201/0094* (2013.01)

(58) Field of Classification Search
  CPC .......... H04N 2201/0094; G06F 3/1222; G06F 3/1238; G06F 3/1285; G06F 21/629; G06F 3/12; G06F 21/31; B41J 29/00; B41J 29/38
  See application file for complete search history.

(56) References Cited

U.S. PATENT DOCUMENTS

| | | | | |
|---|---|---|---|---|
| 2002/0122203 | A1* | 9/2002 | Matsuda | ............ H04N 1/00204 |
| | | | | 358/1.15 |
| 2003/0084067 | A1  | 5/2003 | Obiaya | |
| 2004/0103324 | A1  | 5/2004 | Band | |
| 2011/0128118 | A1* | 6/2011 | Gilleland | ................ B60R 25/24 |
| | | | | 340/5.2 |
| 2011/0137489 | A1* | 6/2011 | Gilleland | ................ B60R 25/24 |
| | | | | 701/2 |
| 2011/0277025 | A1  | 11/2011 | Counterman | |
| 2013/0007858 | A1* | 1/2013 | Shah | ................... H04L 63/0815 |
| | | | | 726/6 |
| 2013/0191884 | A1  | 7/2013 | Leicher | |

FOREIGN PATENT DOCUMENTS

| | | |
|---|---|---|
| JP | 2005267201 | 9/2005 |
| JP | 2010068294 | 3/2010 |
| JP | 2011-191888 | 9/2011 |
| JP | 2011253478 | 12/2011 |
| JP | 2013-58819 | 3/2013 |
| JP | 2013150209 | 8/2013 |
| WO | 2013109857 | 7/2013 |

OTHER PUBLICATIONS

Japanese Office Action dated Jul. 14, 2017 during prosecution of related Japanese application No. 2014-033309. (Cited During Prosecution of Parent U.S. Appl. No. 15/107,034.).

* cited by examiner

MULTI-FUNCTION PERIPHERAL, SYSTEM INCLUDING THE MULTI-FUNCTION PERIPHERAL, INFORMATION PROCESSING APPARATUS, METHOD OF CONTROLLING THE SAME, AND STORAGE MEDIUM

This application is a continuation of U.S. application Ser. No. 15/107,034, filed on Jun. 21, 2016, which is a national stage application under § 371 of International Application No. PCT/JP2015/055728, filed on Feb. 20, 2015, which claims priority to Japan 2014-033309, filed on Feb. 24, 2014, the contents of each of which is hereby incorporated by reference.

TECHNICAL FIELD

The present invention relates to a multi-function peripheral, a system including the multi-function peripheral, an information processing apparatus, a method of controlling the same, and a storage medium.

BACKGROUND ART

Recently, the popularization of OpenID Connect as a next-generation authentication system is being expected. OpenID Connect is mainly used for user authentication for Web service users. OpenID Connect is constituted by OpenID Provider (to be referred to as an OP hereinafter) as an authentication server, UserAgent operated by a user, and Relying Party (to be referred to as an RP hereinafter) which provides services and the like the user wants to use. The use of OpenID Connect provides the following two merits. First, since various services can be used via one user account, there is no need to manage a plurality of user accounts. Second, it is possible to grant authorization to Web services provided by OpenID Provider as an authentication server of OpenID Connect in addition to authentication.

A recent multi-function peripheral allows a user to use the functions implemented in the multi-function peripheral via various types of user interfaces (to be referred to as UIs hereinafter). For example, UIs provided by a multi-function peripheral include, for example, a UI panel (to be referred to as a local UI hereinafter) mounted in the multi-function peripheral and a Web page (to be referred to as a remote UI hereinafter) which can be accessed from the Web browser of a PC connected to the multi-function peripheral via a network. As described above, since the functions of the multi-function peripheral can be used from the respective UIs, a function of performing user authentication for each UI is provided to allow user authentication without omission regardless of the UI from which access is made.

In addition, a recent multi-function peripheral allows user authentication by using an external user authentication server. Even using the authentication server makes it possible to perform user authentication for each UI (see, for example, Japanese Patent Laid-Open No. 2005-267201).

Even when OpenID Connect is used for user authentication for a multi-function peripheral, it is also desirable to perform user authentication for each UI.

SUMMARY OF INVENTION

An aspect of the present invention is to eliminate the above-mentioned problems with conventional technology.

A feature of the present invention is to provide a technique capable of permitting use via an operated UI even when a user has operated any one of a plurality of UIs different from each other and user authentication is performed via a network.

The present invention in its first aspect provides an information processing apparatus comprising: a plurality of user interfaces different from each other; reception means for receiving a user authentication result via a network in response to an instruction for user authentication issued by a user who has operated one of the plurality of user interfaces; determination means for determining a user interface, of the plurality of user interfaces, which has been operated by the user; and permission means for permitting an operation by the user via the user interface determined by the determination means when the user authentication result received by the reception means indicates a success.

The present invention in its second aspect provides a control method of controlling an information processing apparatus including a plurality of user interfaces different from each other, the method comprising: a reception step of receiving a user authentication result via a network in response to an instruction for user authentication issued by a user who has operated one of the plurality of user interfaces; a determination step of determining a user interface, of the plurality of user interfaces, which has been operated by the user; and a permission step of permitting an operation by the user via the user interface determined in the determination step when the user authentication result received in the reception step indicates a success.

The present invention in its third aspect provides a multi-function peripheral comprising: login instruction reception means for receiving a login instruction from a user by using a local user interface; obtaining means for obtaining a Web page for displaying an authentication screen from an authentication server based on the login instruction; display means for displaying the authentication screen based on the Web page; transmission means for transmitting an authentication request including authentication information input by a user via the authentication screen to the authentication server; authorization code reception means for receiving an authorization code from the authentication server as a response to the authentication request; and login control means for permitting login to the multi-function peripheral by a user based on reception of the authorization code.

The present invention in its fourth aspect provides a system comprising an external device and a multi-function peripheral, the multi-function peripheral comprising: login instruction reception means for receiving a login instruction from a Web browser of the external device; and instruction means for instructing the external device to access a URL of an authentication server based on reception of the login instruction, the external device comprising: acquisition means for acquiring a Web page for displaying an authentication screen from the authentication server by accessing the URL instructed by the multi-function peripheral; display means for displaying the authentication screen based on the Web page; authentication information transmission means for transmitting an authentication request including authentication information input by a user via the authentication screen to the authentication server; authorization code reception means for receiving an authorization code from the authentication server as a response to the authentication request; and authorization code transmission means for transmitting the authorization code to the multi-function peripheral, and the multi-function peripheral comprising login control means for permitting login to the multi-function peripheral by a user based on reception of the authorization code.

Further features of the present invention will become apparent from the following description of exemplary embodiments with reference to the attached drawings. Note that the same reference numerals denote the same or similar components throughout the accompanying drawings.

BRIEF DESCRIPTION OF DRAWINGS

The accompanying drawings, which are incorporated in and constitute a part of the specification, illustrate embodiments of the invention and, together with the description, serve to explain the principles of the invention.

DESCRIPTION OF EMBODIMENTS

Embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Although this embodiment will exemplify an MFP (Multi-Function Peripheral) as an information processing apparatus of the present invention, the present invention is not limited to this.

Figure 1:
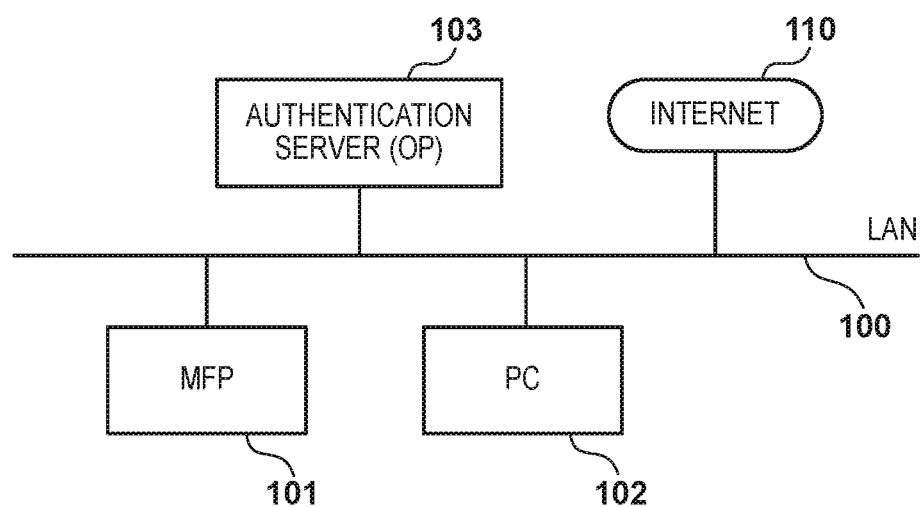
FIG. 1 is a block diagram showing the overall arrangement of an information processing system including an MFP (Multi-Function Peripheral) according to an embodiment of the present invention.

FIG. 1 is a block diagram showing the overall arrangement of an information processing system including an MFP (Multi-Function Peripheral) 101 according to an embodiment of the present invention.

In this information processing system, the MFP 101, a PC 102 which is an external device, an authentication server (OP) 103, and the like are connected to each other via a LAN 100. The PC 102 is used for the management of the MFP 101 using a Web browser or printing by the MFP 101 using a print driver. The LAN 100 is connected to the Internet 110. The authentication server (OP) 103 is an authentication server which performs user authentication by using OpenID. In this case, the authentication server 103 is connected to the LAN 100. However, this server may exist on the Internet 110.

Figure 2:
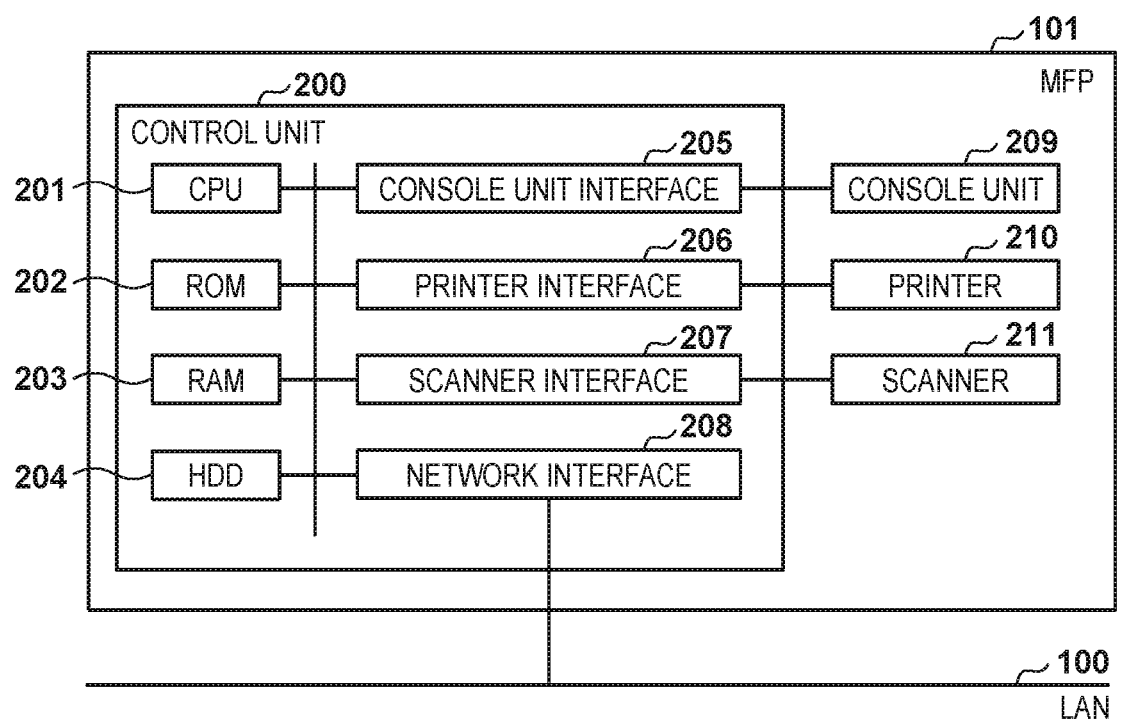
FIG. 2 is a block diagram for explaining the hardware configuration of the MFP according to the embodiment.

FIG. 2 is a block diagram for explaining the hardware configuration of the MFP 101 according to the embodiment.

The MFP 101 has a printing function using a printer 210, a document reading function using a scanner 211, a box function of storing the image data generated by the scanner 211 and the data received from the PC 102 and the like, and the like. In addition, it is possible to transmit via the LAN 100 data stored by the box function or print the data by using the printer 210.

A control unit 200 including a CPU 201 controls the overall operation of the MFP 101. The CPU 201 reads out control programs stored in a ROM 202 and performs various types of control such as printing control, reading control, and transmission control. A RAM 203 is used as the main memory of the CPU 201 and its temporary storage area such as a work area. An HDD 204 stores image data, various types of programs, and various types of data (to be described later). A console unit interface 205 connects a console unit 209 to the control unit 200. A printer interface 206 connects the printer 210 to the control unit 200. The image data to be printed by the printer 210 is transferred from the control unit 200 to the printer 210 via the printer interface 206 and printed on a print medium (sheet). A scanner interface 207 connects the scanner 211 to the control unit 200. The scanner 211 reads an image on a document to generate image data, and supplies the image data to the control unit 200 via the scanner interface 207. A network interface 208 connects the control unit 200 (MFP 101) to the LAN 100. The network interface 208 transmits image data and information to external devices (the PC 102 and the like) on the LAN 100, and receives various types of information from external devices on the LAN 100.

Figure 3:
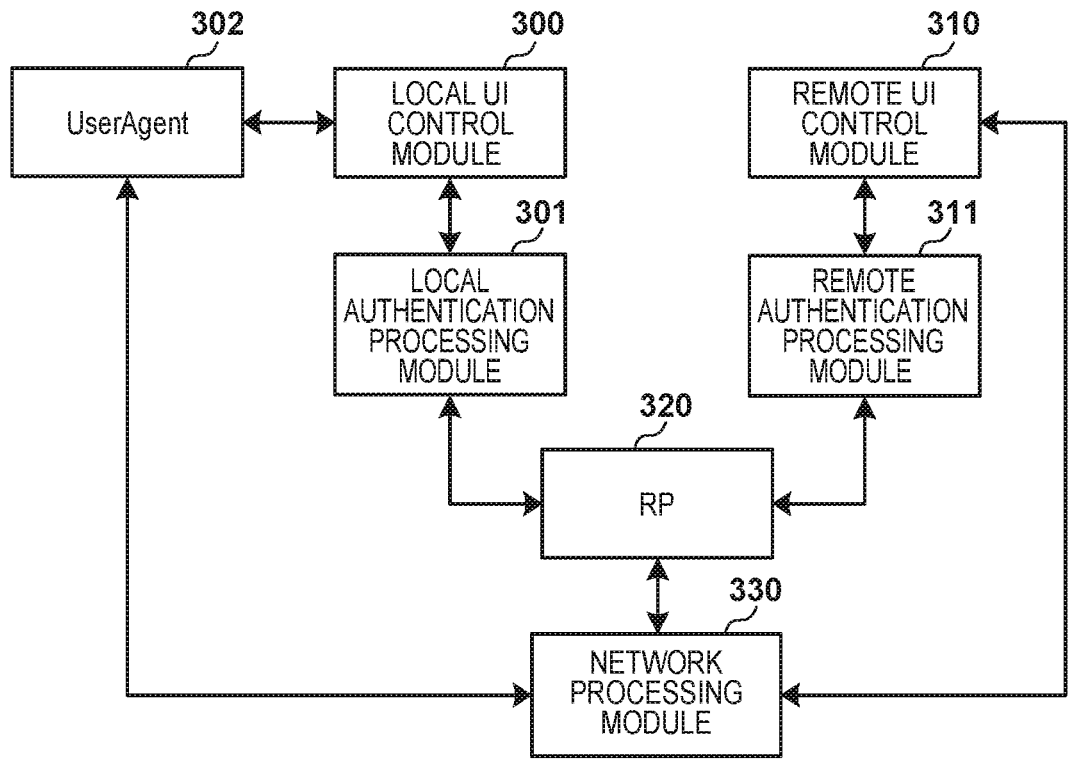
FIG. 3 is a block diagram for explaining the software configuration of the MFP according to the embodiment.

FIG. 3 is a block diagram for explaining the software configuration of the MFP 101 according to the embodiment. Unless otherwise specified, the function of each processing module is implemented by causing the CPU 201 to execute a corresponding control program stored in the ROM 202.

An RP (Relying Party) 320 provides a function of accepting an OpenID Connect authentication request from a UserAgent 302 and receiving an authentication result from the authentication server 103. More specifically, the RP 320 receives a request to display an OpenID authentication screen from the UserAgent 302 and redirects the request to the authentication server 103. In addition, upon receiving an authentication result from the authentication server 103, the RP 320 verifies whether the UserAgent 302 is a local UI or remote UI. Upon acquiring an authentication result from the authentication server 103, the RP 320 notifies a local authentication processing module 301 or a remote authentication processing module 311 of the verification result depending on the result.

A local UI (User Interface) control module 300 provides a function of controlling the console unit 209 via the console unit interface 205. The local UI control module 300 notifies modules such as the local authentication processing module 301 and the UserAgent 302 of the contents of an operation performed by the user with the console unit 209. In addition, upon receiving a screen display request from a module, the local UI control module 300 performs control to display the screen on the console unit 209. Unless otherwise specified, each module displays a screen on the console unit 209 via the local UI control module 300.

The local authentication processing module 301 provides a local authentication function for user authentication which is used when the user uses the MFP 101 from the local control UI. The local authentication processing module 301 displays, for example, the local authentication screen shown in FIG. 4, and performs user authentication based on an input from the user via the local authentication screen (FIG. 4).

Figure 4:
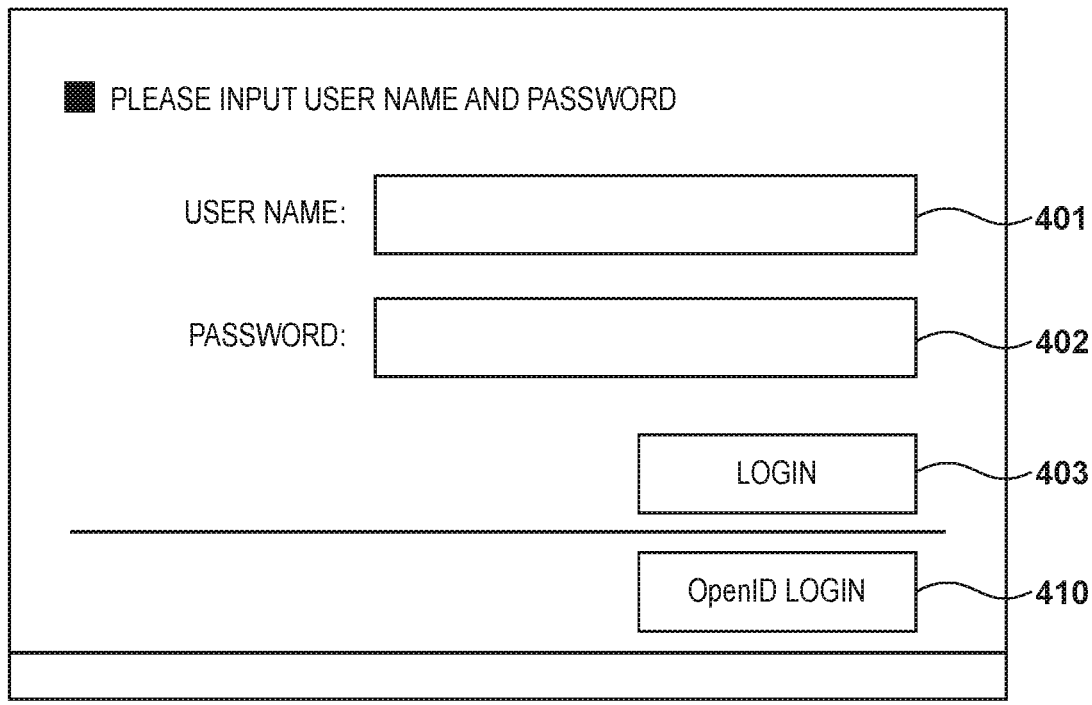
FIG. 4 depicts a view showing an example of a local authentication screen according to the embodiment.

FIG. 4 depicts a view showing an example of a local authentication screen according to the embodiment.

The local authentication screen is a screen for providing a function of performing user authentication for the use of the functions of the MFP 101 from the local UI by the user. A user name input field 401, a password input field 402, and a login button 403 are used for the user authentication of the user of the MFP 101 based on user information managed by the MFP 101. On the other hand, an OpenID login button 410 is used for the user authentication of the user of the MFP 101 based on user information managed by the authentication server 103.

In addition, when the user requests for user authentication with the OpenID login button 410, the local authentication processing module 301 receives the OpenID Connect authentication result from the RP 320. If the user authentication result indicates a success, the user is permitted to operate the functions of the MFP 101. If the user authentication result indicates a failure, for example, the local authentication error screen shown in FIG. 5 is displayed.

Figure 5:
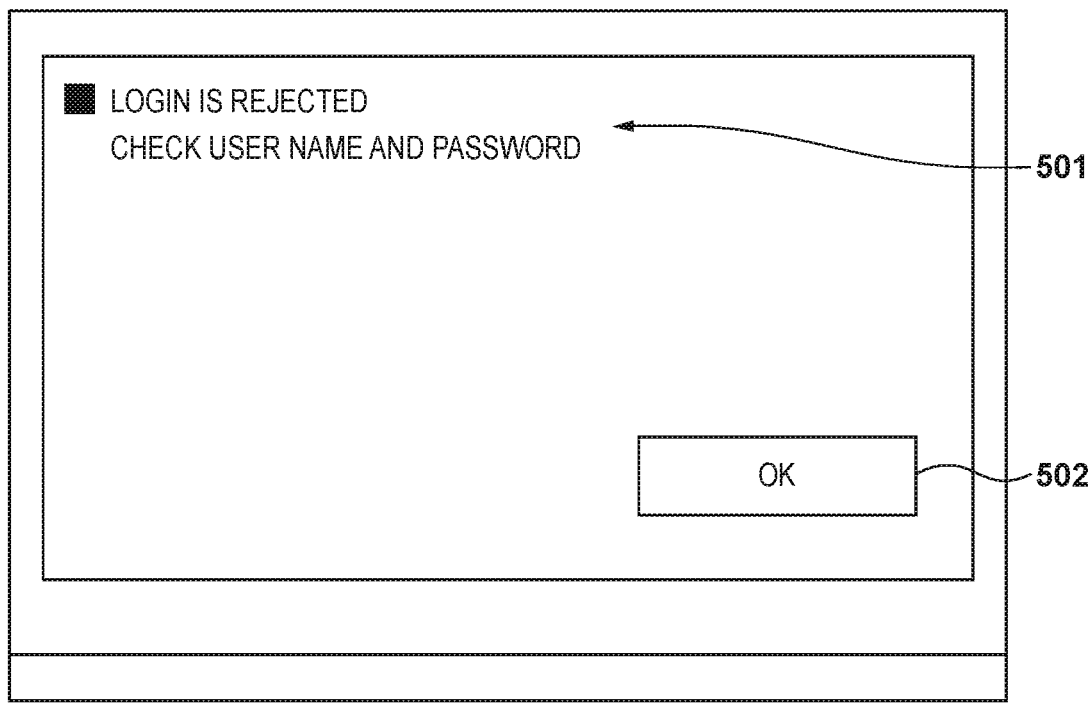
FIG. 5 depicts a view showing an example of an error screen for local authentication according to the embodiment.

FIG. 5 depicts a view showing an example of a local authentication error screen according to the embodiment.

The local authentication error screen is a screen to be displayed when the local authentication processing module 301 determines that user authentication has failed. An error message 501 is a message representing that user authentication has failed. The error message 501 is displayed when the user name or password input by the user is not correct. An OK button 502 is a button for closing this local authentication error screen.

A remote UI control module 310 provides a Web page to the Web browser of the PC 102 via a network processing module 330. The remote UI control module 310 notifies a module such as the remote authentication processing module 311 of the contents of an operation performed by the user with the Web browser of the PC 102. In addition, the remote UI control module 310 receives a request from a module and performs control to display a Web page to the Web browser. Unless otherwise specified, each module displays a Web page to the Web browser via the remote UI control module 310.

The remote authentication processing module 311 provides a remote authentication function for user authentication when a user uses the MFP 101 from the remote UI. The remote authentication processing module 311 displays, for example, the remote authentication screen shown in FIG. 6.

Figure 6:
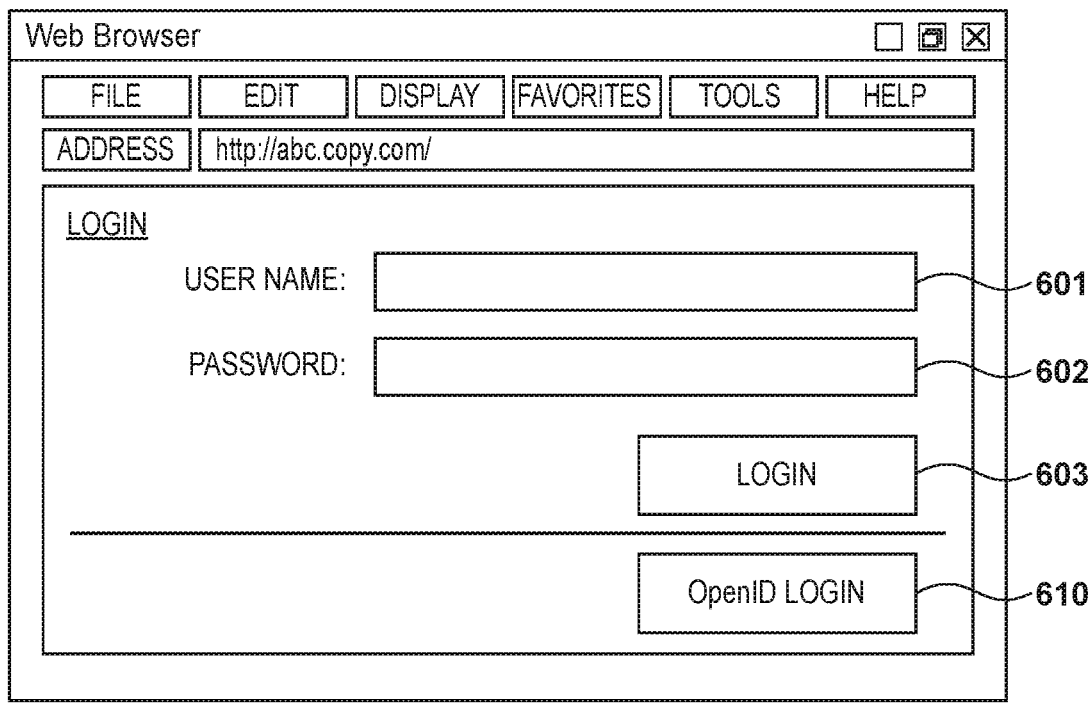
FIG. 6 depicts a view showing an example of a remote authentication screen according to the embodiment.

FIG. 6 depicts a view showing an example of a remote authentication screen according to the embodiment.

This remote authentication screen is a screen of a Web page for user authentication for the use of the functions of the MFP 101 from the remote UI by the user. A user name input field 601, a password input field 602, and a login button 603 are used for the user authentication of the user of the MFP 101 based on user information managed by the MFP 101. On the other hand, an OpenID login button 610 is used to issue an instruction to perform the user authentication of the user of the MFP 101 based on user information managed by the authentication server 103.

The user name input field 601 is a field for inputting a user name by the user of the MFP 101. The password input field 602 is a field for inputting a password by the user of the MFP 101. The login button 603 is a button for issuing an instruction to execute user authentication using the user name and password input by the user. The OpenID login button 610 is a button for issuing an instruction to perform user authentication using OpenID Connect. When the user presses the OpenID login button 610, access is made to the predetermined URL of the RP 320 to display, for example, the OpenID Connect authentication screen shown in FIG. 8.

The remote authentication processing module 311 performs user authentication based on an input from the user via the remote authentication screen in FIG. 6. Alternatively, the remote authentication processing module 311 receives the OpenID Connect authentication result from the RP 320. In this case, if the user authentication result indicates a success, the user is permitted to operate the functions of the MFP 101 via the remote UI. If the user authentication result indicates a failure, for example, the remote authentication error screen shown in FIG. 7 is displayed.

Figure 7:
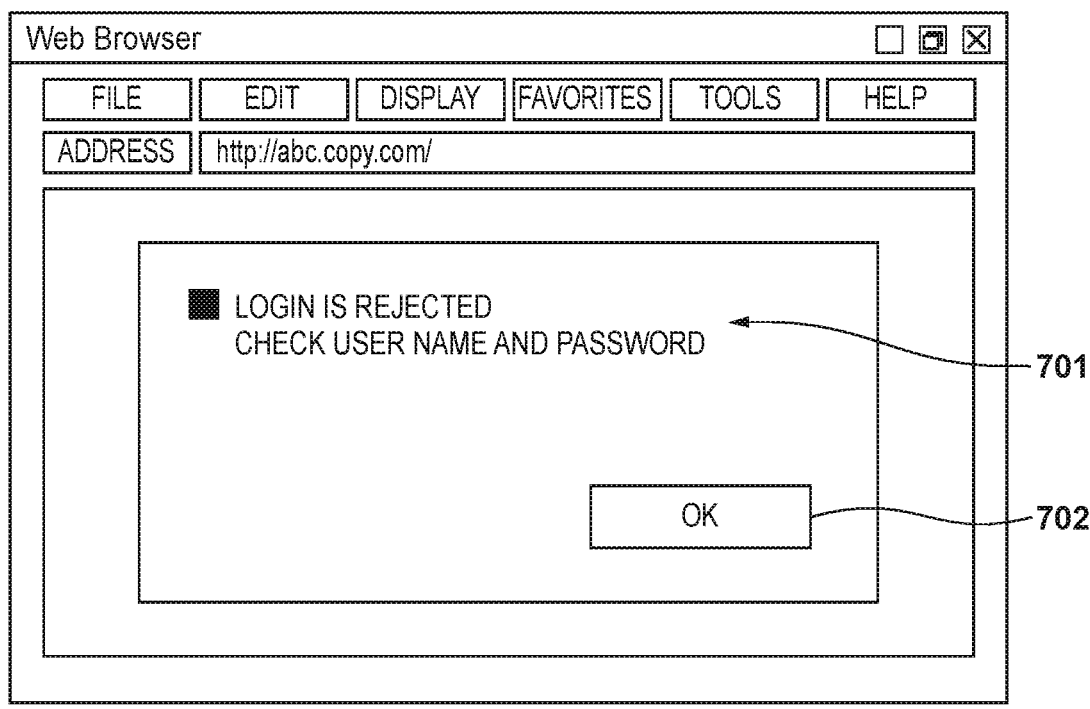
FIG. 7 depicts a view showing an example of a remote authentication error screen according to the embodiment.

FIG. 7 depicts a view showing an example of a remote authentication error screen according to the embodiment.

This remote authentication error screen is a screen of a Web page to be displayed when the user authentication performed by the remote authentication processing module 311 fails. An error message 701 is a message representing that the authentication has failed. The error message 701 is displayed when user authentication has failed because the user name or password input by the user is wrong. An OK button 702 is a button for closing this remote authentication error screen.

The network processing module 330 provides a function of performing transmission/reception of data between a module such as the remote UI control module 310 or the UserAgent 302 and an external device such as the PC 102 or the authentication server 103 by controlling the network interface 208. The UserAgent 302 is an HTTP user agent which, for example, acquires resources by using HTTP, and provides a function of displaying a Web page on the local UI. The UserAgent 302 obtains the Web page provided by the LAN 100 via the network processing module 330 or a Web server on the Internet 110 and displays the page on the console unit 209.

Note that this embodiment relates to user authentication based on user information managed by the authentication server 103, and hence a description of processing associated with user authentication based on user information managed by the MFP 101 will be omitted.

Referring to FIG. 4, the user inputs a user name into the user name input field 401 and inputs the password of the user into the password input field 402. The user then presses the login button 403 to issue an instruction to execute user authentication using the input user name and password. On the other hand, to issue an instruction to execute user authentication using OpenID Connect, the user presses the OpenID login button 410. When the user presses the OpenID login button 410, for example, the OpenID Connect authentication screen shown in FIG. 8 is displayed.

Figure 8:
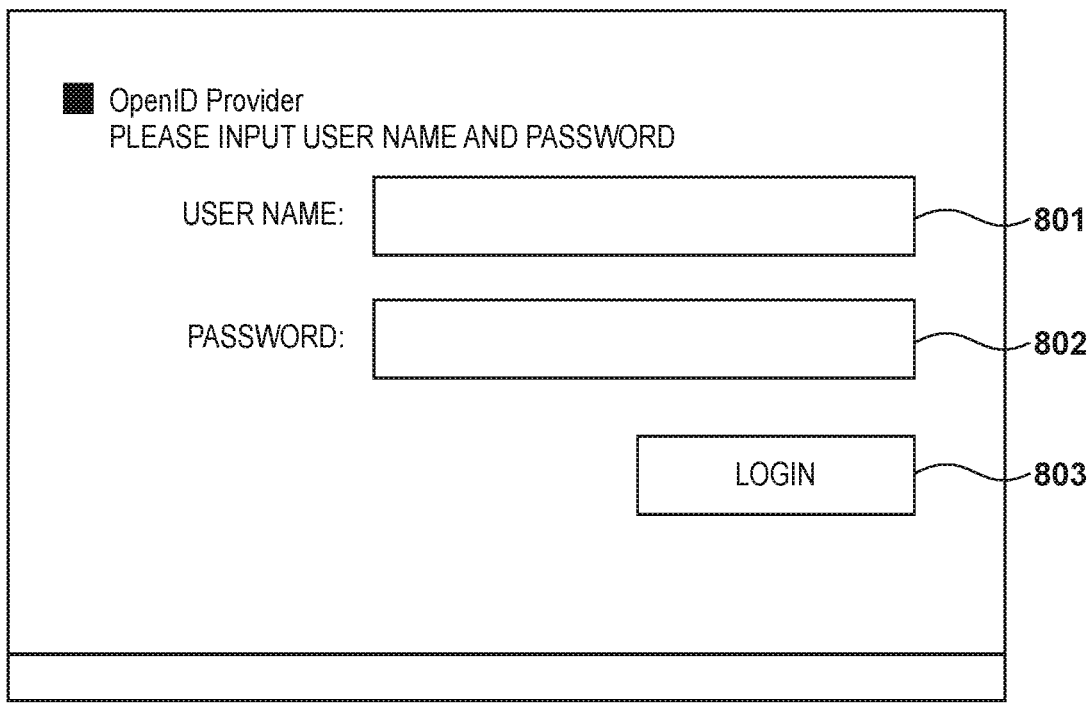
FIG. 8 depicts a view showing an example of an OpenID Connect authentication screen according to the embodiment.

FIG. 8 depicts a view showing an example of an OpenID Connect authentication screen according to the embodiment.

The OpenID Connect authentication screen is a screen provided by the authentication server 103, and differs in screen configuration depending on the authentication server 103. A user name input field 801 is a field for inputting the user name of a user. A password input field 802 is a field for inputting the password of the user. A login button 803 is a button for issuing an instruction to execute user authentication by using the user name and password input by the user via this screen. If a combination of the user name and the password respectively input into the user name input field 801 and the password input field 802 is registered in the authentication server 103, the authentication of the user will succeed.

Note that this embodiment is directed to user authentication based on user information managed by the authentication server 103, and hence a description of processing associated with user authentication based on user information managed by the MFP 101 will be omitted.

Figure 9:
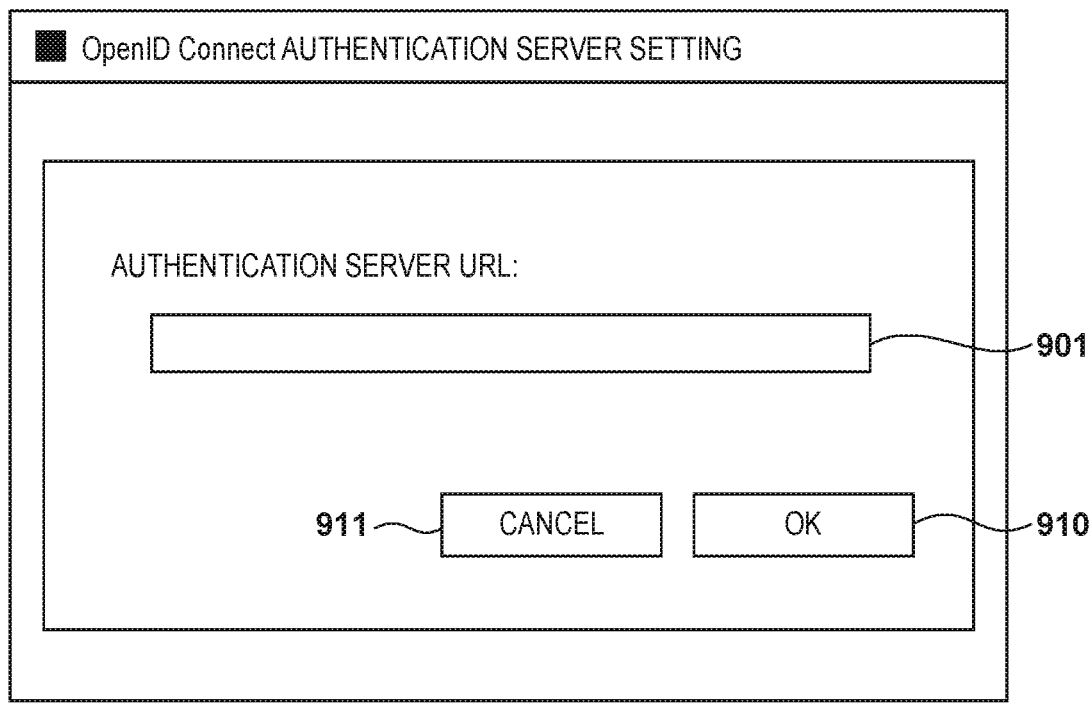
FIG. 9 depicts a view showing an example of a setting screen for an OpenID Connect authentication server according to the embodiment.

FIG. 9 depicts a view showing an example of a setting screen for the OpenID Connect authentication server according to the embodiment.

This setting screen for the OpenID Connect authentication server is a screen for setting the authentication server 103 used for user authentication using OpenID Connect. An authentication server URL input field 901 is a field for inputting the URL of the authentication server 103. An OK button 910 is a button for confirming the setting made via this screen. When the user presses the OK button 910, the value input into the authentication server URL input field 901 is saved. A cancel button 911 is a button for canceling the setting input via the screen. When the user presses the cancel button 911, the value input into the authentication server URL input field 901 is discarded, and the screen is closed.

Note that in this embodiment, one authentication server 103 is registered in the MFP 101, and the corresponding authentication screen is displayed. However, a plurality of authentication servers 103 may be registered to allow the user to select one of the authentication servers 103 which is to be used for authentication.

Figure 10:
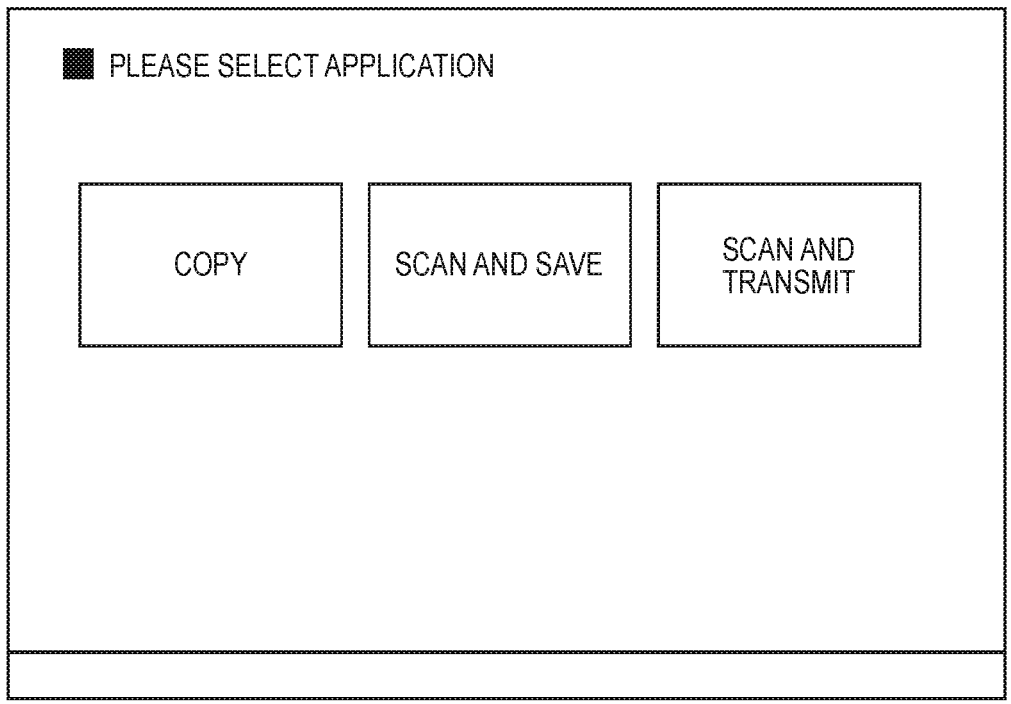
FIG. 10 depicts a view showing an example of a main menu screen of a local UI according to the embodiment.

FIG. 10 depicts a view showing an example of the main menu screen of the local UI according to the embodiment.

The main menu screen (operation screen) of the local UI is a screen for allowing the user to select each function of the MFP 101, and is displayed on the console unit 209 when user authentication via the local UI succeeds.

Figure 11:
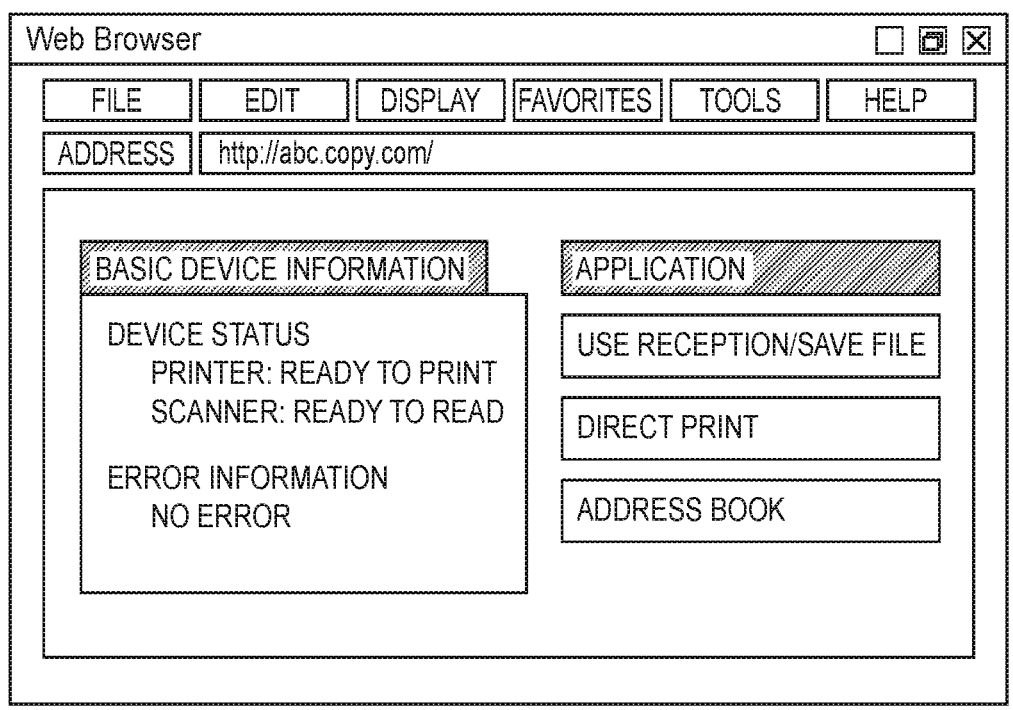
FIG. 11 depicts a view showing an example of a portal screen of a remote UI according to the embodiment.

FIG. 11 depicts a view showing an example of the portal screen of a remote UI according to the embodiment.

The portal screen (operation screen) of the remote UI is a screen for allowing the user to select each function of the MFP 101, and is displayed on the remote UI when user authentication via the remote UI succeeds.

A procedure for processing for user authentication using OpenID Connect on the local UI will be described first with reference to the sequence chart of FIG. 12. A procedure for processing on the remote UI will be described next with reference to the sequence chart of FIG. 13. A procedure for user authentication processing on the RP 320 will be finally described with reference to the flowchart of FIG. 14.

The control unit 200 includes the CPU 201, the RAM 203, the ROM 202, and the HDD 204 in this specification. Note that programs indicating procedures shown in the sequence charts of FIGS. 12 and 13 and the flowchart of FIG. 14 are stored in any of the RAM 203, the ROM 202, and the HDD 204 of the control unit 200, and these processes are implemented by being executed under the control of the CPU 201.

Figure 12:
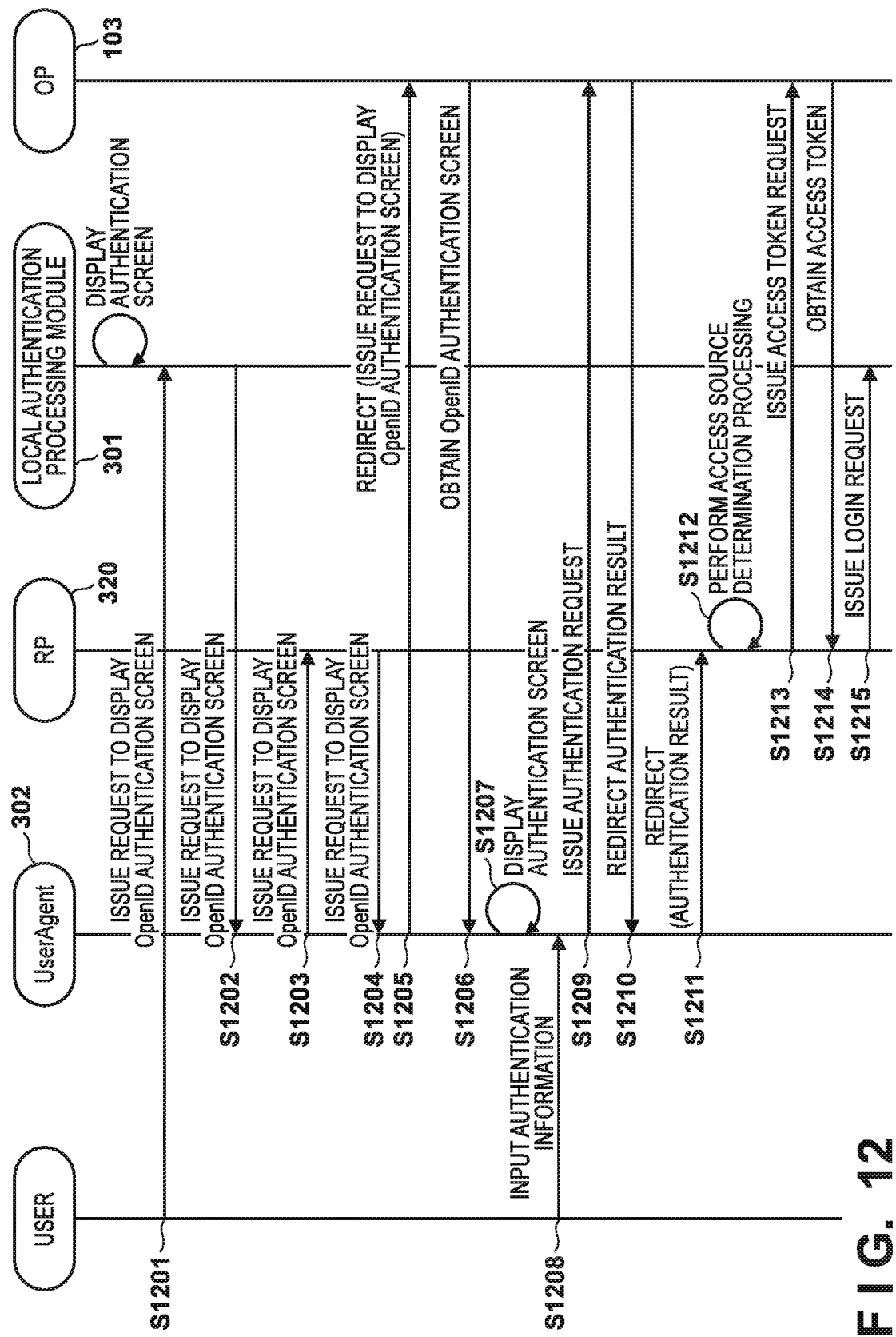
FIG. 12 is a sequence chart for explaining user authentication processing using OpenID Connect on a local UI of the MFP according to the embodiment.

FIG. 12 is a sequence chart for explaining user authentication processing using OpenID Connect on the local UI of the MFP 101 according to the embodiment.

This processing starts from a state in which the MFP 101 is activated, and the local authentication screen (FIG. 4) is displayed on the console unit 209 by the local authentication processing module 301. First of all, in step S1201, the local authentication processing module 301 detects that the user has pressed the OpenID login button 410 on the screen in FIG. 4. In step S1202, the local authentication processing module 301 requests the UserAgent 302 to display the OpenID Connect authentication screen (FIG. 8). More specifically, the local authentication processing module 301 designates the URL of the RP 320 and requests the UserAgent 302 to display a Web page on the console unit 209. Upon receiving this request, the UserAgent 302 executes step S1203.

In step S1203, the UserAgent 302 accesses the URL of the RP 320 to display the Web page at the designated URL. The accessed RP 320 instructs the UserAgent 302 in step S1204 to access the URL of the authentication server 103 set on the OpenID Connect authentication server setting screen (FIG. 9) by redirecting. In this case, the RP 320 also designates a redirect URI (Uniform Resource Identifier) as a redirect destination in step S1211 with respect to the authentication server 103.

In step S1205, the UserAgent 302 accesses the authentication server 103 to request for an OpenID authentication screen. In step S1206, the UserAgent 302 obtains the OpenID authentication screen from the authentication server 103. In step S1207, the UserAgent 302 displays the OpenID Connect authentication screen (FIG. 8) on the console unit 209.

In step S1208, the UserAgent 302 accepts the input of user authentication information from the user. In step S1209, upon detecting that the user has pressed the login button 803, the UserAgent 302 transmits the user name and password input by the user to the authentication server 103 and requests the authentication server 103 to perform user authentication. In step S1210, the authentication server 103 redirects the user authentication result to the redirect URI of the RP 320 designated in step S1205. With this operation, the RP 320 receives the user authentication result from the UserAgent 302 in step S1211. At this time, if the authentication succeeds, the RP 320 receives an authorization code.

In step S1212, the RP 320 determines whether the access made by the user is access from the Web browser of the PC 102 or access from the console unit 209 of the MFP 101. This determination may be performed by referring to the Cookie function of the Web browser. In step S1213, the RP 320 issues a request to obtain an access token to the authentication server 103 by using the authorization token obtained in step S1211. In step S1214, the RP 320 receives the result. Upon succeeding in receiving an access token in step S1214, the RP 320 executes step S1215 to permit login by the user. In contrast to this, upon failing to receive an access token, the RP 320 displays a local authentication error screen (FIG. 5). In step S1215, based on the access source determination result in step S1212, the RP 320 issues a login request to the local authentication processing module 301 if access from the local UI is determined, and to the remote UI if access from the remote UI is determined. Since FIG. 12 shows a case in which access is made from the local UI, the RP 320 issues a login request to the local authentication processing module 301 in step S1215. Upon receiving the login request, the local authentication processing module 301 permits the user to use the functions of the MFP 101 from the console unit 209. More specifically, the local UI control module 300 displays the local UI main menu screen (FIG. 10) on the console unit 209.

Figure 13:
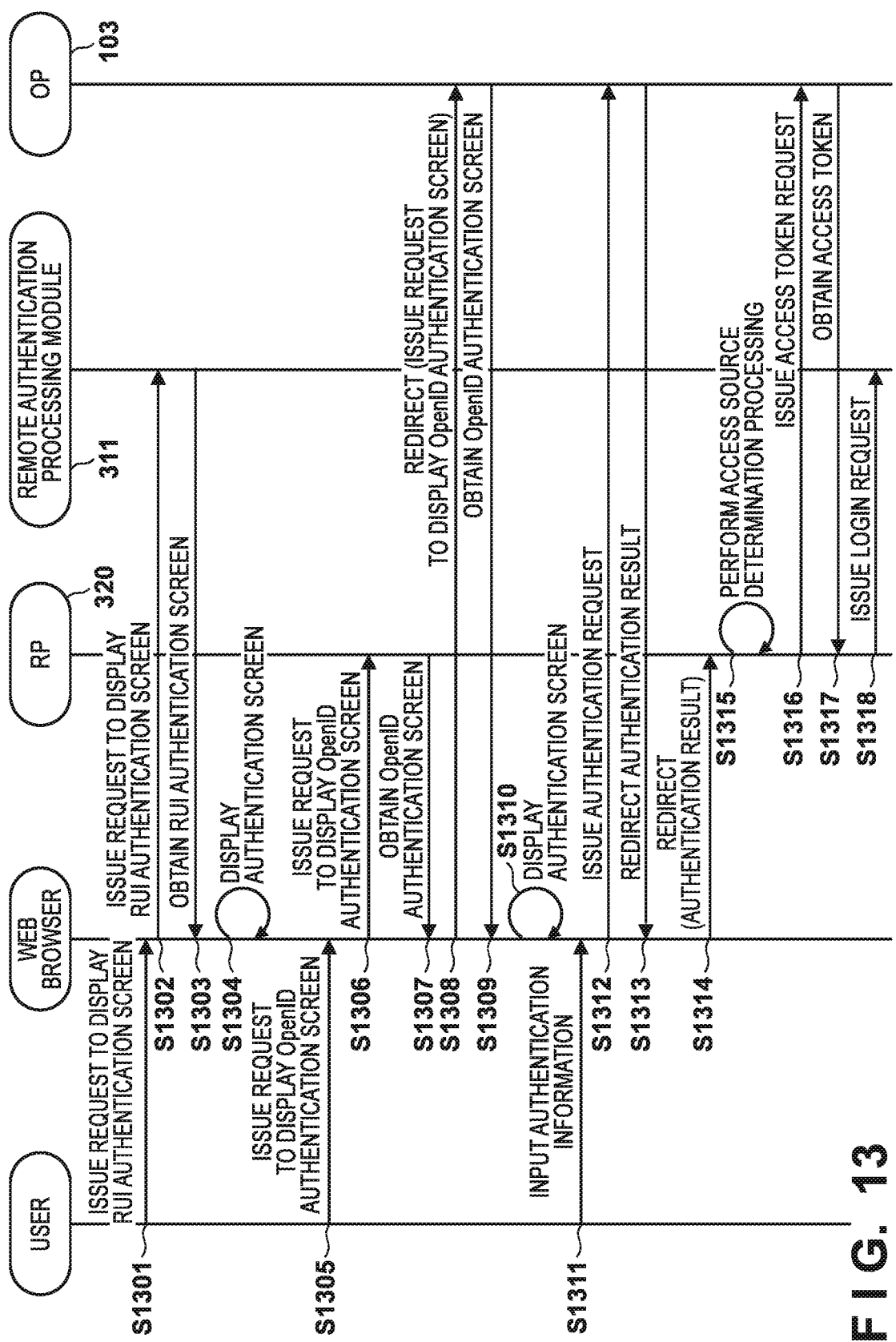
FIG. 13 is a sequence chart for explaining user authentication processing using OpenID Connect on the remote UI of the MFP according to the embodiment.
Figure 14:
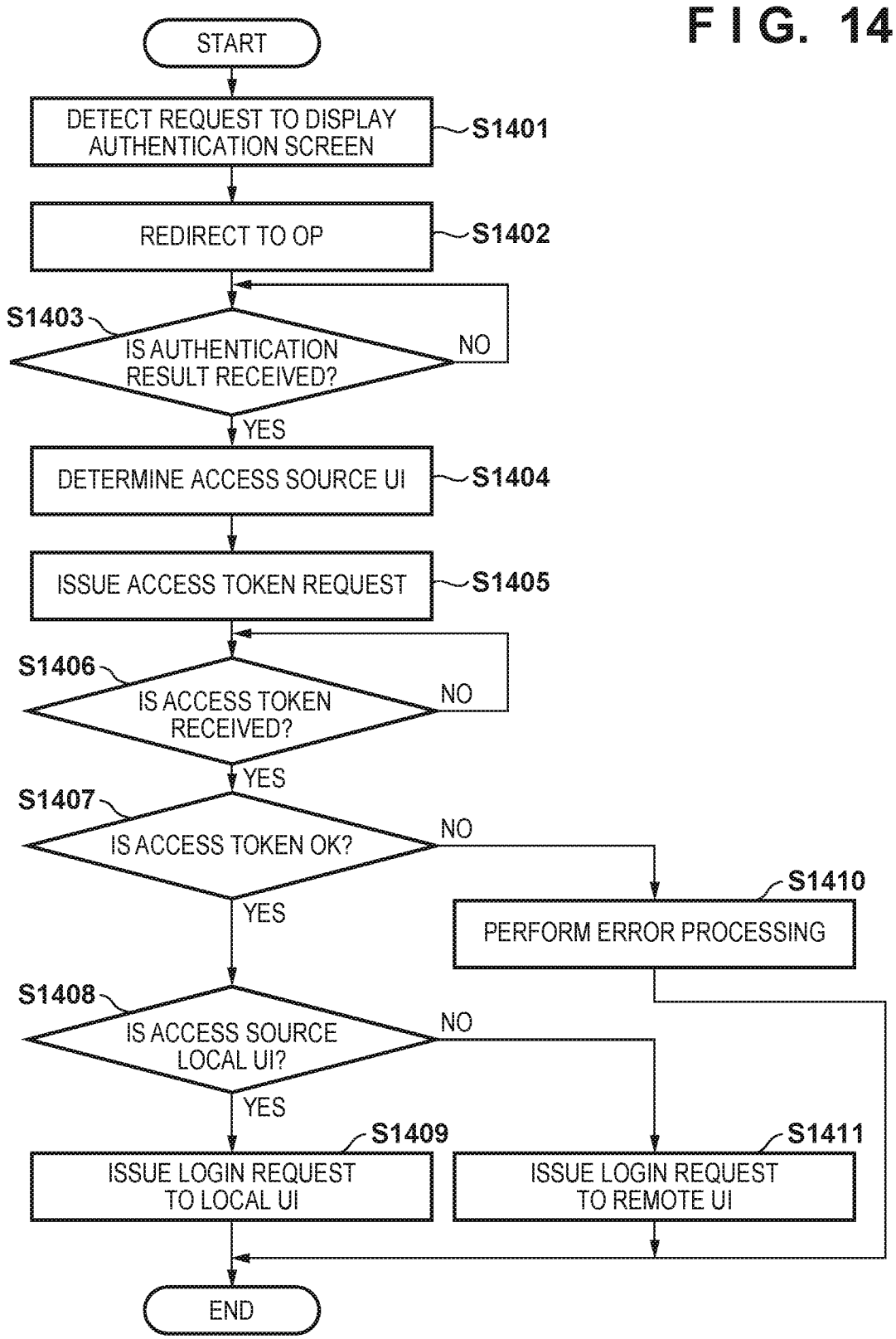
FIG. 14 is a flowchart for describing user authentication processing by an RP of the MFP according to the embodiment.

FIG. 13 is a sequence chart for explaining user authentication processing using OpenID Connect on the remote UI of the MFP 101 according to the embodiment.

This processing starts from a state in which the MFP 101 is activated, and the remote UI control module 310 is ready to provide a Web page to the Web browser of the PC 102 via the network processing module 330.

In steps S1301 and S1302, the remote authentication processing module 311 executes step S1303 upon receiving an authentication screen display request for the remote UI (RUI) which is performed by the user using the Web browser. In step S1303, the remote authentication processing module 311 transmits a remote UI authentication screen to the Web browser. This causes the Web browser of the PC 102 to display the remote authentication screen (FIG. 6) in step S1304.

If the user presses the OpenID login button 610 on this screen in step S1305 and the Web browser accesses the predetermined URL of the RP 320 in step S1306, the RP 320 receives the access from the Web browser. In step S1307, the RP 320 instructs the Web browser to access the URL of the authentication server 103 set via the OpenID Connect authentication server setting screen (FIG. 9) by redirecting. At this time, the RP 320 also designates a redirect URI as a redirect destination in step S1314 with respect to the authentication server 103.

With this operation, in step S1308, the Web browser accesses the authentication server 103. In step S1309, the Web browser obtains an OpenID Connect authentication screen. In step S1310, the Web browser displays the OpenID Connect authentication screen (FIG. 8). In step S1311, the Web browser accepts the input of user authentication information from the user via the OpenID Connect authentication screen. In step S1312, upon detecting that the user has pressed the login button 803, the Web browser issues a user authentication request by transmitting the user name and password input by the user to the authentication server 103. In step S1313, the authentication server 103 redirects the user authentication result to the redirect URI of the RP 320 designated in step S1308. In step S1314, the RP 320 receives the user authentication result. If the authentication succeeds, the RP 320 receives an authorization code and executes step S1315.

In step S1315, the RP 320 determines whether the access made by the user is access from the Web browser of the PC 102 or access from the console unit 209 of the MFP 101. In step S1316, the RP 320 issues a request to obtain an access token to the authentication server 103 by using the authorization token obtained in step S1313. In step S1317, the RP 320 receives the result. Upon succeeding in receiving an access token in step S1317, since it indicates that the user authentication has succeeded, the RP 320 executes step S1318. If the RP 320 fails to receive an access token, the RP 320 displays the remote authentication error screen (FIG. 7).

In step S1318, based on the determination result in step S1315, the RP 320 issues a login request to the local authentication processing module 301 if access from the local UI is determined, and to the remote UI if access from the remote UI is determined. Since FIG. 13 shows a case in which access is made from the remote UI, the remote authentication processing module 311 which has received the login request in step S1318 permits the user to use the functions of the MFP 101 from the remote UI. More specifically, the remote UI control module 310 displays the portal screen (FIG. 11) of the remote UI on the remote UI.

FIG. 14 is a flowchart for describing user authentication processing by the RP 320 of the MFP 101 according to the embodiment. The processing starts when the MFP 101 is activated, and a request to display the OpenID Connect authentication screen (FIG. 8) from the UserAgent 302 or the Web browser is received.

First of all, when the RP 320 receives a request to display an authentication screen from the UserAgent 302 or the Web browser in step S1401, the process advances to step S1402. In step S1402, the RP 320 redirects to the URL of the authentication server 103 set on the OpenID Connect authentication server setting screen (FIG. 9). At this time, the RP 320 also designates a redirect URI as an access destination in step S1403 with respect to the authentication server 103.

The process then advances to step S1403, in which the RP 320 waits for the reception of a user authentication result. When the RP 320 receives the authentication result, the process advances to step S1404. At this time, the RP 320 obtains an authorization code as an authentication result from the authentication server 103. In step S1404, the RP 320 determines whether the access made by the user is access from the Web browser (remote UI) of the PC 102 or access from the console unit 209 (local UI) of the MFP 101. If access from the console unit 209, that is, the local UI, is determined, the access is made from the UserAgent 302. If access from the remote UI is determined, the access is made from the Web browser. A specific determination method is as follows. The UserAgent 302 uses a unique value for the User-Agent header of HTTP. The RP 320 then checks the User-Agent header value to determine that the access is made from the local UI, if the header value is the unique value. If the header value is other than the unique value, the RP 320 determines that the access is made from the remote UI. Another determination method is as follows. In step S1401, different URLs are designated as access destinations of the RP 320 depending on whether a display request is issued from the local UI or the remote UI. This differentiates between processes after access to the RP 320 based on this URL. This differentiation processing is as follows. Different URLs are set as redirect URIs to be notified to the authentication server 103 in step S1402 depending on whether access is made from the local UI or the remote UI. This makes it possible to determine the access source of access from the user based on the access destination URL in step S1403.

The process then advances to step S1405, in which the RP 320 issues a request to obtain an access token to the authentication server 103 by using the authorization token obtained in step S1403. The process then advances to step S1406. In step S1406, the RP 320 waits for the reception of an access token from the authentication server 103. When the RP 320 receives an access token, the process advances to step S1407, in which the RP 320 verifies the received access token. If the token is a correct access token, the process advances to step S1408. If the token is an incorrect access token, the process advances to step S1410 to execute error processing such as issuing an instruction to display an error screen.

If the RP 320 determines in step S1408 that the access is made from the local UI based on the access source determination result in step S1404, the process advances to step S1409 to issue a login request to the local authentication processing module 301. Thereafter, the local UI control module 300 displays the local UI main menu screen (FIG. 10) on the console unit 209. On the other hand, if the RP 320 determines in step S1408 that the access is made from the remote UI, the process advances to step S1411 to issue a login request to the remote UI. With this operation, the remote UI control module 310 displays the portal screen (FIG. 11) of the remote UI on the remote UI of the remote UI control module 310.

Executing the above processing makes it possible to authenticate the user of the MFP 101 from a plurality of different UIs by using OpenID Connect.

As has been described above, according to this embodiment, it is possible to authenticate the user of an MFP from a plurality of different UIs by using OpenID Connect. This makes it possible to use various types of services with one user account by using OpenID Connect even if an MFP is used by using a plurality of UIs. This makes it unnecessary to manage a plurality of user accounts. In addition, it is possible to not only perform authentication but also grant authorization to a Web service provided by an OpenID Connect authentication server.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-033309, filed Feb. 24, 2014 which is hereby incorporated by reference herein in its entirety.

The invention claimed is:

1. An information processing apparatus capable of connecting to an authentication server via Internet, comprising:
a processor and a memory configured to function as:
a providing unit configured to provide a local user interface controlled by a console unit of the information processing apparatus and a remote user interface controlled by another information processing apparatus connected to the information processing apparatus via a network;
a reception unit configured to, in a case that a user instruction for user authentication that is received from a user who has operated the local user interface or the remote user interface is an instruction for the authentication server, present an authentication screen provided from the authentication server to the user regardless of whether the user instruction is received from the local user interface or the remote user interface, and transmit authentication information accepted via the authentication screen displayed by the local user interface or the remote user interface to an authentication server via the network and receive a user authentication result from the authentication server via the network;
a determination unit configured to determine whether a user interface that is an access source is the local user interface or the remote user interface based on an access destination URL in a case that the received authentication result indicates successful; and
a permission unit configured to permit an operation by the user via the user interface determined by the determination unit,
wherein, in a case that the operation by the user is permitted by the permission unit, the processor displays a Web page on the console unit of the information processing apparatus if the user interface operated by the user is the local user interface, and the processor displays the Web page on a console unit of the another information processing apparatus if the user interface operated by the user is the remote user interface,
wherein the determination unit performs determination by referring to a value of a User-Agent header of HTTP, and
wherein the processor and the memory are further configured to function as a screen display unit configured to, when the permission unit permits an operation by the user via the user interface determined by the determination unit, display an operation screen corresponding to the user interface determined by the determination unit.

2. The apparatus according to claim 1, wherein the local user interface includes the console unit of the information processing apparatus and the remote user interface includes a Web page accessible from a Web browser of the another information processing apparatus connected to the information processing apparatus via the network.

3. The apparatus according to claim 1, wherein the remote user interface includes an instruction unit that issues an instruction for instructing user authentication using OpenID Connect.

4. The apparatus according to claim 3, wherein the processor and the memory are further configured to function as:
a display unit configured to receive and display the authentication screen.

5. The apparatus according to claim 1, wherein the determination unit performs determination by referring to a URL of the information processing apparatus.

6. The apparatus according to claim 1, wherein the determination unit performs determination by referring to a Cookie function of a Web browser.

7. A method of controlling an information processing apparatus capable of connecting to an authentication server via Internet, the method comprising:
providing a local user interface controlled by a console unit of the information processing apparatus and a remote user interface controlled by another information processing apparatus connected to the information processing apparatus via a network;
in a case that a user instruction for user authentication that is received from a user who has operated the local user interface or the remote user interface is an instruction for the authentication server, presenting an authentication screen provided from the authentication server to the user regardless of whether the user instruction is received from the local user interface or the remote user interface;
transmitting authentication information accepted via the authentication screen displayed by the local user interface or the remote user interface to the authentication server via the network and receiving a user authentication result from the authentication server via the network;
determining whether a user interface that is an access source is the local user interface or the remote user interface based on an access destination URL in a case that the received authentication result indicates successful; and
permitting an operation by the user via the user interface determined in the determining,
wherein, in a case that the operation by the user is permitted in the permitting, displaying a Web page on the console unit of the information processing apparatus if the user interface operated by the user is the local user interface, and displaying the Web page on a console unit of the another information processing apparatus if the user interface operated by the user is the remote user interface,
wherein the determining performs determination by referring to a value of a User-Agent header of HTTP, and
wherein the method further comprises, when the permitting permits an operation by the user via the user interface determined by the determining, displaying an operation screen corresponding to the user interface determined by the determining.

8. A non-transitory computer-readable storage medium storing a program for causing a computer to execute a method of controlling an information processing apparatus capable of connecting to an authentication server via Internet, the program comprising:
code for providing a local user interface controlled by a console unit of the information processing apparatus and a remote user interface controlled by another information processing apparatus connected to the information processing apparatus via a network;
code for, in a case that a user instruction for user authentication that is received from a user who has operated the local user interface or the remote user interface is an instruction for the authentication server, presenting an authentication screen provided from the authentication server to the user regardless of whether the user instruction is received from the local user interface or the remote user interface;
code for transmitting authentication information accepted via the authentication screen displayed by the local user interface or the remote user interface to the authentication server via the network and receiving a user authentication result from the authentication server via the network;
code for determining whether a user interface that is an access source is the local user interface or the remote user interface based on an access destination URL in a case that the received authentication result indicates successful; and
code for permitting an operation by the user via the user interface determined in the determining,
wherein, in a case that the operation by the user is permitted in the permitting, displaying a Web page on the console unit of the information processing apparatus if the user interface operated by the user is the local user interface, and displaying the Web page on a console unit of the another information processing apparatus if the user interface operated by the user is the remote user interface,
wherein the code for determining performs determination by referring to a value of a User-Agent header of HTTP, and
wherein the program further comprises code for, when the permitting permits an operation by the user via the user interface determined by the determining, displaying an operation screen corresponding to the user interface determined by the determining.

* * * * *